Figure 1:
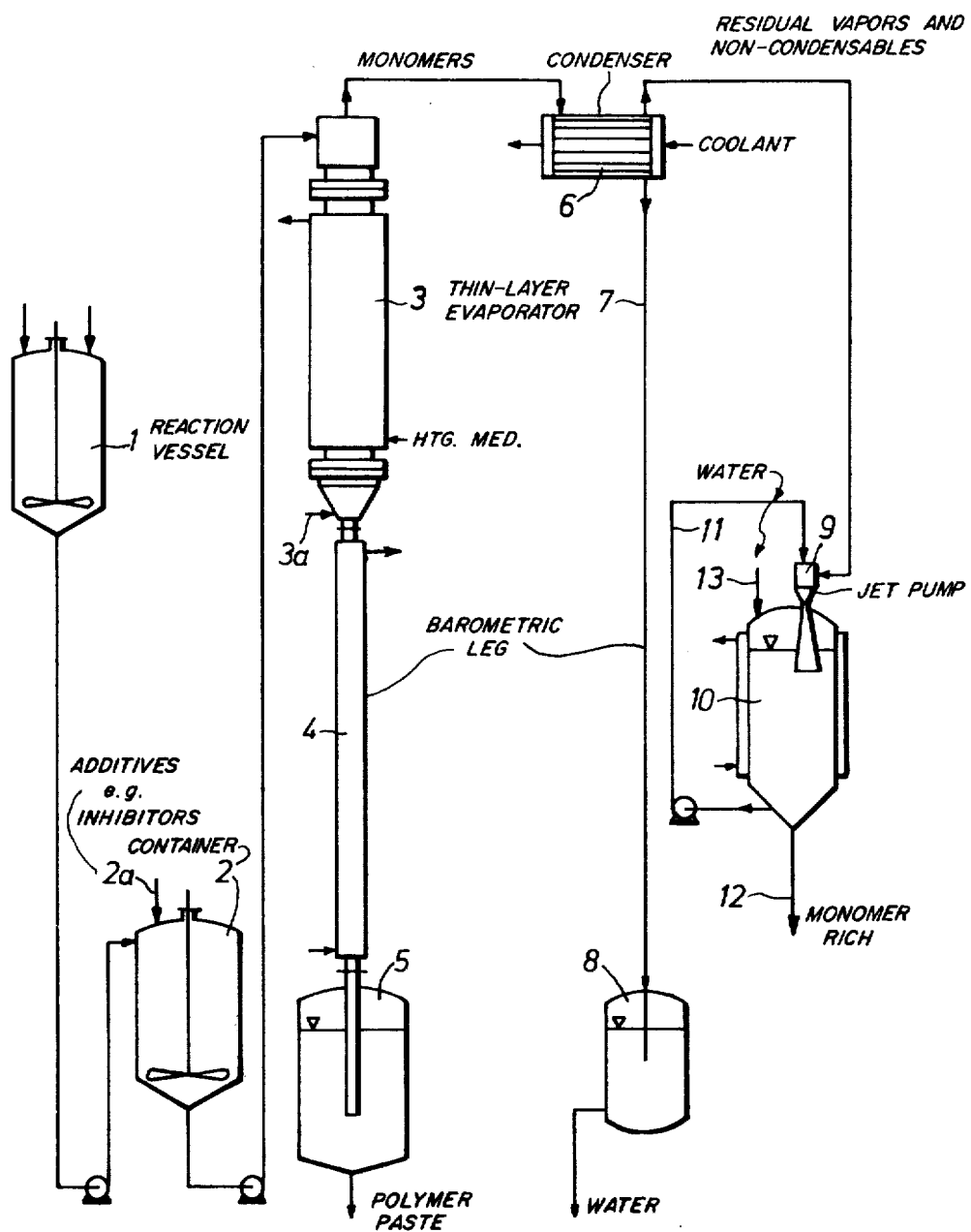

United States Patent [19]

Wilhelm et al.

[11] 3,980,529
[45] Sept. 14, 1976

[54] PROCESS FOR SEPARATING AND RECOVERING RESIDUAL MONOMERS FROM AQUEOUS SUSPENSIONS OF ACRYLONITRILE POLYMERS

[75] Inventors: Gerd Wilhelm, Norf; Karl Hurm; Rolf-Burkhard Hirsch, both of Dormagen; Artur Jäschke, Cologne; Herbert Marzolph, Dormagen, all of Germany

[73] Assignee: Bayer Aktiengesellschaft, Leverkusen, Germany

[22] Filed: Apr. 21, 1975

[21] Appl. No.: 569,932

[30] Foreign Application Priority Data

Apr. 27, 1974  Germany............................ 2420471

[52] U.S. Cl.................................. 203/89; 202/236; 159/13 R; 159/49; 159/17 VS; 159/DIG. 10; 526/328; 526/341; 526/342; 526/501
[51] Int. Cl.²...................... B01D 3/00; B01D 1/22; C08F 220/42
[58] Field of Search................. 203/89, 90, 8, 9, 91; 202/236; 159/13, 48, 49, DIG. 10, 17 VS; 260/88.7 B, 85.55, 88.7 R

[56] References Cited
UNITED STATES PATENTS

| | | | |
|---|---|---|---|
| 2,348,328 | 5/1944 | Chapman et al...................... | 159/49 |
| 3,073,380 | 1/1963 | Palmason............................. | 159/49 |
| 3,223,534 | 12/1965 | Kelly................................. | 159/17 VS |
| 3,454,542 | 7/1969 | Cheape, Jr. et al. .......... | 260/88.7 B |
| 3,467,162 | 9/1969 | Putnam................................ | 159/49 |
| 3,634,300 | 1/1972 | Fischer et al................... | 260/88.7 B |

*Primary Examiner*—Jack Sofer
*Attorney, Agent, or Firm*—Plumley and Tyner

[57] ABSTRACT

The invention relates to a process for the recovery of acrylonitrile and other monomers from an aqueous polymer dispersion by continuous distillation in a thin-layer evaporator under reduced pressure, condensation of the evaporated monomers in a condenser under the same or similar reduced pressure and subsequent condensation or absorption respectively of the monomer vapors which have not been condensed in the condenser at a higher pressure.

9 Claims, 2 Drawing Figures

PROCESS FOR SEPARATING AND RECOVERING RESIDUAL MONOMERS FROM AQUEOUS SUSPENSIONS OF ACRYLONITRILE POLYMERS

This invention relates to a process for the production of acrylonitrile polymers and copolymers having an acrylonitrile content of at least 40% by weight, of the type used for the production of textile filaments. More particularly this invention relates to a process by which the residual monomers can be removed from an aqueous dispersion of the polymers without any adverse effect upon the polymers, particular allowance being made for economic, non-pollutive production.

The large-scale production of acrylonitrile polymers and copolymers suitable for the manufacture of textile filaments essentially comprises polymerising the monomers continuously or in batches in an aqueous medium in the presence of a suitable polymerisation initiator. Depending upon the polymerisation conditions, the polymers accumulate in fine-grained form with a different structure in aqueous dispersion. They have to be subsequently separated from the aqueous medium, washed and dried. All the steps involved in this production cycle have to be looked at both from the point of view of meeting the demand for an economic, non-pollutive process, i.e. from the point of view of avoiding emissions of noxious substances, also from the point of view that, ultimately, the polymers are intended to give textile filaments which satisfy consumer demands. Irrespective of whether the filaments are dry spun or wet spun, the polymers have to be produced and worked up in such a way that they enable subsantially colourless, heat stable concentrated spinning solutions to be prepared.

In the production of acrylonitrile polymers, there are already various known methods for working up the reaction mixture and for recovering the residual monomers:

For example, the polymer dispersion run off from the polymerisation vessel and optionally subjected to intermediate storage can be filtered by means of a continuous-cycle apparatus for example drum filters or filter centrifuges, and subsequently washed with a washing liquid, such as water, in order to separate unreacted monomer and to wash out salt residues. The monomer-containing washing waters and the mother liquor are then rectified in order to recover the monomer. Although this method of working up does have the advantage that, during filtration, the polymer does not suffer any direct damage which could lead to discoloration of the filaments to be produced, it is nevertheless attended by serious disadvantages in regard to the degree of recovery of the monomers. These disadvantages lead to relatively high losses and necessitate heavy capital expenditure to avoid emissions of monomer during filtration and drying of the polymer attributable to monomer residues which have not been completely removed from the polymer. In the copolymerisation of monomers which are sparingly, if at all, soluble in water, the disadvantages of this process can become so serious that this method of working up cannot be applied. This applies particularly to comonomers with a much lower boiling point than acrylonitrile.

In another known method of working up, the polymer dispersion removed from the polymerisation vessel is delivered to a rectification column with suitably designed flights. In this column, most of the residual monomers are subsequently removed from the dispersion, optionally under reduced pressure. The energy required for evaporation can be applied by directly blowing steam into the dispersion in the sump of the column. Although it is possible in this process to avoid certain disadvantages of the working up technique described above, for example in regard to recovery of the monomers and comonomers, serious disadvantages have to be accepted as well. Even if the distillation conditions are selected in such a way that distillation is carried out under reduced pressure, for example at pressures in the range from 200 to 600 Torr, the polymer dispersion undergoes heat damage, resulting in yellowed filaments, during its fairly prolonged passage through the column. If the pressure is further reduced, for example to 100 Torr, corresponding to a boiling temperature of the water of approximately 52°C, serious difficulties are additionally encountered when it comes to condensing the monomers recovered, especially where comonomers of low boiling point are used. This process is attended by yet another disadvantage. As it flows through the rectification column, the polymer dispersion gives off spray, with the result that the entire inner surfaces of the column soon become covered with polymer crusts which grow particularly quickly into dead zones, i.e. zones through which the dispersion is no longer able to flow, and gradually harden. Since hard crusts of this kind are extremely difficult to remove, it is necessary to interrupt recovery after only very short periods in order to clean the column.

U.S. Pat. No. 3,553,248 relates to a process in which the polymer dispersion is freed from unreacted monomers in vacuo in an evaporator. In this process, the dispersion substantially free from residual monomers is subsequently separated by filtration into filtrate and polymer. In this process, the filtrate is reused for condensing and absorbing the vapours escaping from the evaporator. The monomers collected in the filter water are reused with it for polymerisation.

Unfortunately, reuse of the filtrate involves serious disadvantages because, where the process is carried out in this way, molecular weight distribution is broadened and the heat stability of the polymers reduced. In addition, when the filtrate is recycled directly into the polymerisation process, the high degree of consistency in molecular weight required for fibre products in particular is difficult to obtain because the kinetics of polymerisation are modified in the long term by an accumulation of impurities of which only traces are present in the filtrate.

Accordingly, the object of the present invention is to remove the unpolymerised monomers from the dispersion leaving the polymerisation reactor without accompanying disadvantages in regard to the quality of the resulting polymer. The monomer losses of the process as a whole are kept to only a few tenths percent by weight of the monomer input, without any need for the filtrate separated from the polymer to be directly recycled into the process.

It has now been found that this object can be achieved by evaporating off the unreacted monomers from the polymer dispersion in a thin-layer evaporator and subsequently condensing and/or absorbing the monomer vapours which are evolved.

Accordingly, the invention provides a process for the separation and recovery of unreacted acylonitrile and comonomers with a boiling point below 99°C under normal conditions from an aqueous polymer dispersion of a filament-forming acrylonitrile polymer, wherein a filterable polymer dispersion, the liquid phase of which may contain up to 7% by weight of residual monomer, is subjected continuously and uniformly to straightforward distillation in a thin-layer evaporator, the pressure prevailing inside the thin-layer evaporator being regulated so that the temperature of the evaporating liquid phase of the polymer dispersion does not exceed 95°C, the average residence time of the polymer dispersion in the evaporator does not exceed 5 minutes, and the evaporation rate of the liquid phase amounts to up to 30% by weight, wherein the vapours given off during evaporation are condensed in a condenser initially under substantially the same pressure which prevails in the thin-layer evaporator and at temperatures above 0°C, after which the vapours which have not been condensed in the condenser are compressed to a pressure higher than that prevailing in the condenser, and wherein the monomer-rich phases obtained, following separation of the aqueous phases, are returned to the polymerisation process.

Optionally, a polymerisation inhibitor is added to the polymer dispersion prior to distillation. The temperature of the evaporating liquid is regulated through the pressure prevailing inside the evaporator in such a way that it does not exceed 95°, preferably 75°C.

However, the critical factor is that the average residence time in the evaporator should only be a few seconds and, in general, should be no longer than 5 minutes and preferably no longer than 20 seconds. On leaving the evaporator, the non-evaporated residue is cooled to a lower temperature, preferably to between 20° and 25°C.

The vapours given off, containing water, acrylonitrile and comonomer, are delivered to a condenser which is under substantially the same pressure as the evaporator. This condenser should be operated at temperatures above 0°C on the condensation side to prevent solids from being formed through the freezing of water. The comonomers which cannot be condensed in the condenser, i.e. predominantly readily volatile comonomers, are compressed to atmospheric pressure in the same way as the condensate. Whereas the liquid phase can be brought to atmospheric pressure, for example through barometric down pipes, the non-condensed vapours may be compressed in a water ring pump, subsequently condensed at temperatures above 0°C or arrested by absorption in a suitable adsorbent in a washing column. Alternatively, the residual vapours which are not condensed under reduced pressure but which are condensable under atmospheric pressure at temperatures above 0°C, can be compressed and, at the same time, condensed in the propulsive jet of a jet pump. The propellant can be both water and acrylonitrile.

The application of distillation techniques for the direct removal of readily volatile residual monomers under reduced pressure from the polymer dispersion is known from the literature. It is possible by applying these techniques, which operate in countercurrent, to obtain a polymer paste substantially free from residual monomers. Despite the application of reduced pressure and the possible reduction in the distillation temperature to below 75°C which this involves, product damage reflected in yellowing of the polymer occurs in this process. For this reason, there are limits to the application of distillation techniques of this kind.

It is surprising that, in accordance with the present invention, the residual monomers can be removed by straightforward distillation in a thin-layer apparatus, because it is not normally possible to obtain complete removal of the readily volatile constituents in this way. Another surprising feature of the process according to the invention is that, even with evaporation rates of only about 12% by weight of the liquid phase, the liquid phase is substantially free from monomers.

In contrast to conventional rectification columns, the average residence time in continuous-cycle thin-layer evaporators can be very short. Since it is not only the treatment temperature but also, and above all, the treatment time which is the crucial factor so far as yellowing of the polymer is concerned, it is possible to produce a polymer which shows hardly any change in colour in relation to its untreated state in the thin-layer evaporator. Accordingly, the advantage of the process is that, in general, it is possible to free the liquid phase of the polymer dispersion substantially completely from residual monomers by subjecting the dispersion as a whole to brief thin-layer distillation, without producing any significant changes in the polymer, especially in regard to its colour.

The problem of condensing the monomer-rich vapours given off in the thin-layer evaporator can be solved in different ways. The difficulty is that the condenser like the separator generally operates under the same pressure and that, on account of the necessary reduction in the pressure prevailing in the thin-layer evaporator, the condensation temperature of the volatile vapours is also reduced. Since the vapours also contain water, the condenser should generally not be operated on the coolant side at temperatures which would enable the vapours to be condensed at temperatures lower than 0°C, because otherwise solids would be formed through freezing of the water. In general, the monomers cannot be completely condensed under reduced pressure. According to the invention, therefore, the monomeric vapours, which are not condensed in a condenser which operates under the same pressure as the thin-layer evaporator and which does not fall below a condensation temperature of 0°C, are initially compressed to elevated pressures, preferably atmospheric pressure, so that the condensation of the monomer vapours can now be increased to beyond 0°C.

Compression of the vapours to atmospheric pressure and their condensation or absorption at this pressure level is preferably carried out by means of a liquid jet gas pump. The propellant of the jet pump, which also takes up the condensed vapours, may be water which may be reused with the condensed monomers. However, it is also possible, and in some cases necessary, to use another propellant, for example acrylonitrile, instead of water.

The method according to the invention for removing and recovering residual acrylonitrile and other comonomers from aqueous polymer dispersions can be applied to any conventional comonomers with little or no solubility in water. Where the comonomers have a boiling point above 99°C at atmospheric pressure, they are not taken into consideration so far as assessing the activity of the process is concerned. The following compounds inter alia may be used as comonomers: methyl acrylate, vinyl acetate, allyl ethyl ether, allyl methyl ether, allyl isopropyl ether, allyl propyl ether, methyl vinyl ether, ethyl vinyl ether, isobutyl vinyl ether, isopropyl vinyl ether, butyl vinyl ether, 1-butene, isobutene, 1-pentene, vinylidene chloride, vinyl bromide, isopropenyl bromide, isopropenyl chloride, isobutenyl chloride, methacrylonitrile, methyl vinyl ketone, isopropenyl methyl ketone and vinyl chloride.

The effectiveness of the process according to the invention is guaranteed providing the concentration of the comonomers in the liquid phase of the polymer dispersion before entry into the thin-layer evaporator does not exceed 2.0% by weight. In cases where the comonomers used boil at temperatures below 0°C under atmospheric pressure, a propellant which is able to dissolve the vaporous comonomers is used instead of water for the liquid jet of the jet pump used for condensing and absorbing the comonomer-containing vapours.

Exemplary embodiments of the invention are illustrated in the accompanying drawing and described in more detail in the following:

FIG. 1 shows schematically that part of the production process in which the residual monomers are removed from the polymer dispersion and recovered in the condenser.

The polymer is prepared in aqueous medium in a reaction vessel 1. Additives (2a), for example inhibitors, may be added to the mixture in a container 2. From the container 2, the polymer dispersion is continuously delivered to a heated thin-layer evaporator 3, in which readily volatile constituents (monomers) are removed under reduced pressure, preferably under 200 to 400 Torr. If the liquid phase of the dispersion contains up to a total of 7% by weight of acrylonitrile, up to 30% by weight, preferably from 10 to 15% by weight of the liquid phase are evaporated off. The polymer dispersion, which is substantially free from residual monomers, is cooled and condensed in a barometric down pipe 4. Water may be added at the lower end 3a of the thin-layer evaporator 3 in order to increase the fluency of the polymer dispersion. The polymer paste substantially free from monomers may be run off from a collecting vessel 5 for further processing. The monomer vapours given off in the thin-layer evaporator are deposited in a condenser 6 which works under substantially the same pressure as the thin-layer evaporator 3. On the coolant side, the condenser is operated in such a way that temperatures of 0°c and lower do not occur on the condensation side. The condensate is compressed to atmospheric pressure in a container 8 through a down pipe 7. In a jet pump 9, the residual vapours issuing from the condenser 6 are compressed and, except for non-condensable and non-absorbable fractions, are liquefied and absorbed.

If the jet pump is operated with water as propellant, as is preferably the case, the water being circulated from the container 10 through the pipe 11, two liquid phases are formed in the container 10, one of which contains acrylonitrile and another monomer, whilst the other predominantly contains water and possibly another monomer. The monomer-rich liquid can be heavier or lighter than the aqueous phase, depending upon the type and quantity of the monomer present in addition to acrylonitrile. The monomer-rich phase is continuously removed from the container 10 via the pipe 12. The recirculating liquid is cooled as required by the system pressure. Any water that has to be added may be introduced through the pipe 13. Instead of mainly water, acrylonitrile may also be mainly used as propellant for the jet pump 9. In this case, it is predominantly the water-rich phase which is run off through the pipe 12, and the container 10 filled with acrylonitrile through the pipe 13.

Figure 2:
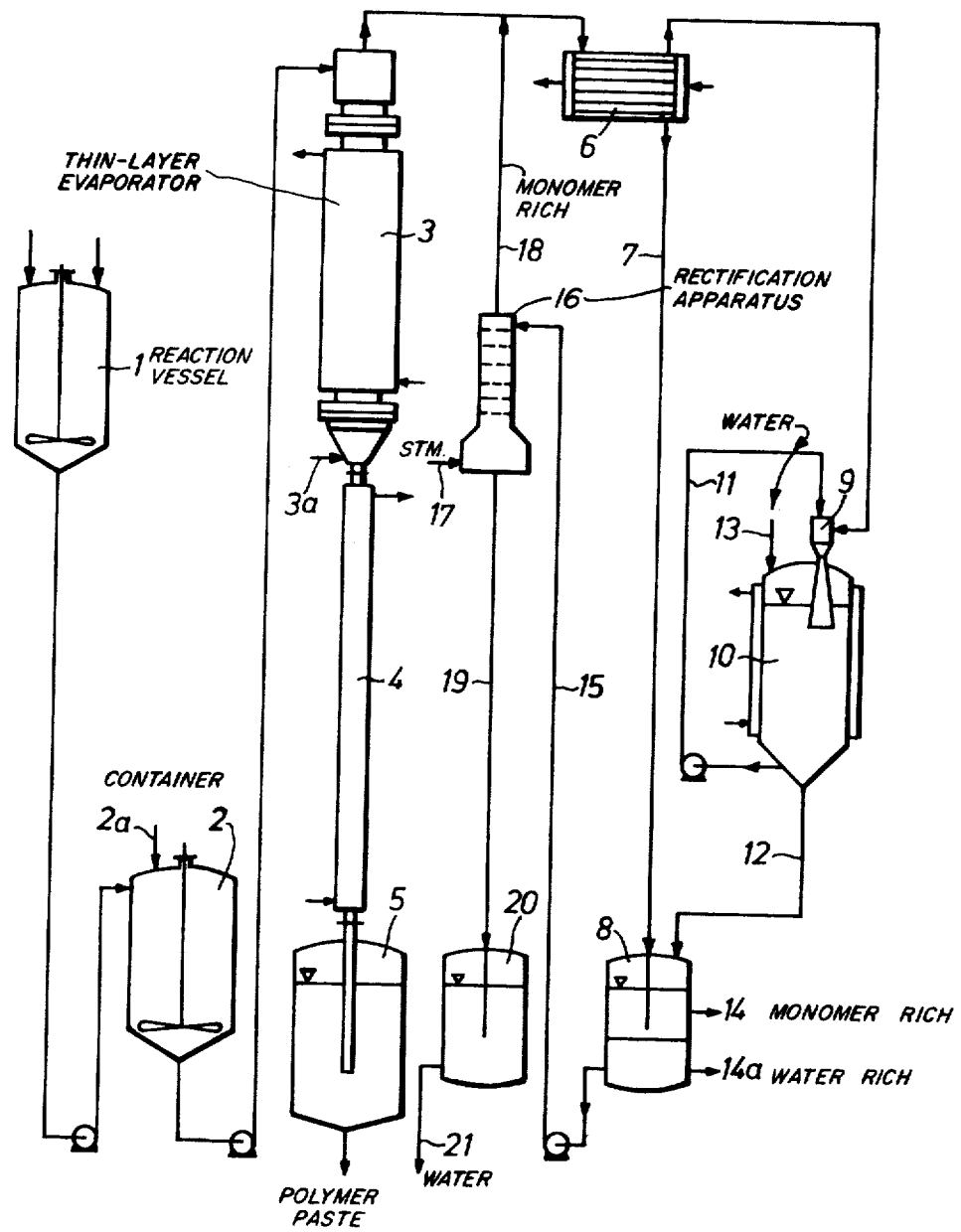

In the same way as the production process does not directly reuse the liquid which issues together with the polymer at the lower end of the thin-layer evaporator 3 according to FIG. 1, it can also be advisable not to reuse the water present in the condensate accumulating in the container 8 FIG. 1. In general, two liquid phases are formed from the condensate accumulating in the container 8. In this case, the water-rich phase can be freed from residual lower-boiling constituents, more especially monomer constituents, in a rectification process, as shown in FIG. 2. The apparatus and components with the references 1 to 13 illustrated in FIG. 2 are identical with those illustrated and denoted by the same references in FIG. 1. In contrast to the process illustrated in FIG. 1, the condensate accumulating in the container 8 in FIG. 2 is separated by settling into two layers. The water-rich phase is delivered to a rectification apparatus 16 through the pipe 15. This apparatus is heated by steam 17. The monomer-rich vapours escaping from the column are combined through pipe 18 with the stream of vapour issuing from the thin-layer evaporator 3 and delivered to the condenser 6. The water freed from readily volatile constituents is removed from the process through the pipe 19, the container 20 and the pipe 21.

Vacuum generation by a system of the kind denoted by references 9 to 13 in FIG. 1 remains possible in this case as well, as in particular does the use of acrylonitrile-rich or water-rich propellant liquid in the container 10. The liquid issuing from the temperable container 10 is also delivered to the separation vessel 8. Any propellant liquid that has to be added may also be introduced from the separation vessel 8 into the container 10 via the pipe 13, the monomer-rich liquid or water-rich liquid being removable through the pipe 14 or the pipe 14a, depending upon the particular procedure adopted.

The effectiveness of a thin-layer apparatus in the separation of residual monomers and the influence of temperature and residence time upon colour are demonstrated in Examples 1 to 3.

Examples 4 and 5 show that, in contrast to a comparison process, the process according to the invention, in addition to being highly economical, reduces the emission of monomer from the process as a whole, thus contributing towards nonpollutive production.

EXAMPLE 1

A polymer dispersion was continuously introduced into a standard commercial thin-layer apparatus of the type manufactured by Luwa AG, Zurich, for separation of the monomers. The diameter of the heat-exchanging pipe was 80 mm and the heated pipe length 500 mm. 20% by weight of the inflowing polymer dispersion consisted of a copolymer of 95% by weight of acrylonitrile and 5% by weight of methyl acrylate, and the rest of liquid phase. The liquid phase contained 3.1% by weight of residual monomer, mainly acrylonitrile in addition to less than 0.5% by weight of methyl acrylate.

A pressure of 250 Torr was maintained at the upper end of the evaporator. Heating was regulated in such a way that 13% by weight of the liquid phase introduced were converted into vapour. The monomers were separated until the liquid phase of the issuing polymer dispersion contained less than 0.1% by weight of residual monomer.

In order to characterise the polymers in regard to their whiteness and tendency towards discoloration under the effect of heat, the "colour index" of the polymer is determined by the following method:

A 13% by weight solution of the polymer in pure dimethyl formamide is prepared. To this end, 26 g of polymer are thoroughly mixed with 174 g of dimethyl formamide in a stopper-equipped glass vessel, and the resulting mixture vigorously shaken for 1 hour at room temperature. The solution is then poured into a stirrer-equipped vessel and kept at 75°C for 6 hours, during which a gentle stream of air is passed over the surface of the solution. The change in colour is measured against pure dimethyl formamide by the difference method using a Zeiss photometer Elko III with an S 42 E filter (layer thickness 50 mm).

Under the working conditions described above, the colour indices of the material introduced amounted on average to 0.15. The polymer treated in the thin-layer evaporator had an average colour index of 0.18. The increase in the colour index caused by treatment of the product in the evaporator is only minimal and is still within the scattering range of the colour index values of the starting material.

EXAMPLE 2 (COMPARISON EXAMPLE)

The apparatus described in Example 1 was used again. However, the pressure prevailing in the evaporator was increased so that a pressure of 600 Torr was measured in the measuring zone. Heating was again regulated so that 13 % by weight of the liquid phase of the inflowing mixture were evaporated. The same mixture as in Example 1 was delivered to the evaporator. Although it was found that separation of the residual monomers from the liquid phase of the polymer dispersion was again surprisingly good and that the residual monomer contents in the issuing mixture were of the same order as in Example 1, the colour index values of the issuing polymer were considerably increased. In relation to the comparison value of on average 0.13 of the polymer introduced, the average colour index of the issuing mixture rose to 0.25 which is unacceptably high.

EXAMPLE 3 (COMPARISON EXAMPLE)

On this occasion, the starting mixture with the composition specified in Example 1 was partly evaporated not in a thin-layer evaporator, but in a vessel equipped with a stirrer having a capacity of 3 cubic meters. The mixture was not continuously delivered to the vessel, but was introduced in one batch. A pressure of 250 Torr was maintained in the vapour zone of the stirrer-equipped vessel which was kept under a vacuum. The heating was regulated so that, once again, 13% by weight of the liquid phase of the dispersion were evaporated over a period of 30 minutes accompanied by intensive stirring. In this case, too, the result of separation was relatively favourable as in the preceding Examples and amounted to less than 0.15% by weight of residual monomers in the liquid of the treated polymer dispersion. The colour index values of the treated polymer increased to a final value of 0.52 after a treatment time of 30 minutes.

Examples 1 to 3 clearly show that the removal of the residual monomers from aqueous polymer dispersions of predominantly polyacrylonitrile involves overcoming a separation problem which, for an economically reasonable cost, enables most of the residual monomer to be evaporated off without any adverse effect upon the quality of the polymer, especially in regard to its colour. Separation systems such as rectification columns with heated sumps would enable the residual monomers to be completely removed. As shown in Example 3, however, prolonged residence times of the polymer dispersion, despite moderate boiling temperatures, produce a considerable deterioration in colour. Surprisingly, a satisfactory separation result is obtained by straightforward distillation in a thin-layer evaporator with very low evaporation rates. Comparison of Examples 1 and 2 shows that the boiling temperature of the mixture has to be adjusted through the pressure prevailing in the evaporator and adapted to the residence time of the product in the evaporator in such a way that the colour index of the polymer is not significantly changed by the treatment in an apparatus of this kind.

EXAMPLE 4

The continuous copolymerisation of acrylonitrile with vinylidene chloride (a comonomer which is substantially insoluble in water), of the type carried out for the production of substantially non-inflammable filaments, is taken as an example. Copolymers of this kind are particularly sensitive to heat in so far as their tendency towards discolouration is concerned.

A polymer dispersion prepared by known copolymerisation processes, 16% by weight of which consisted of a copolymer of 60% by weight of acrylonitrile, 37% by weight of vinylidene chloride and 3% by weight of methacroyl amino benzene benzene disulphimide, and 84% by weight of aqueous phase, was continuously introduced into a thin-layer evaporator under the conditions described in Example 1. The aqueous phase of the dispersion introduced still contained 1.9% by weight of acrylonitrile and 0.6% by weight of vinylidene chloride. The residual monomer content of the issuing liquid phase still amounted to 0.08% by weight. The dispersion was subsequently filtered in an encapsulated rotary drum pressure filter of the type manufactured by BHS AG, washed, dewatered to a water content of approximately 50% by weight and then dried. The non-recoverable residual monomer fraction amounted to 0.7% by weight of the monomer used. The fibre colour index of the 6.7 dtex fibres dry spun from a polymer amounted to 0.63. The fibre colour index was determined by measuring the extinction of a 13% by weight solution of the fibre material in dimethyl formamide against pure dimethyl formamide by the difference method using a Zeiss photometer ELKO III with an S 42 E filter (layer thickness 50 mm).

EXAMPLE 5 (COMPARISON EXAMPLE)

A polymer dispersion which had been obtained as in Example 4 by copolymerising acrylonitrile, vinylidene chloride and methyacroyl aminobenzene benzene disulphimide and which contained 16% by weight of copolymer and, in the liquid phase, 1.9% by weight of acrylonitrile and 0.6% by weight of vinylidene chloride, was introduced into an encapsulated rotary drum pressure filter of the type manufactured by BHS AG and filtered, washed, dewatered to a water content of approximately 50% and dried under the same conditions as described in Example 4. The filtrate and washing water containing residual monomer which accumulated in the rotary pressure filter were delivered under atmospheric pressure to a rectification column in order to recover the monomer. At approximately 1.5% by weight of the monomer used, the nonrecoverably residual monomer fraction was more than twice larger than that in Example 4. The colour index of the 6.7 dtex fibres produced from the polymer amounted to 0.61 and, hence, was in the range of Example 4 within the accuracy of measurement.

Examples 4 and 5 demonstrate the advantage of the proposed recovery process in regard to the non-recoverable fractions of residual monomers and in regard to colour index in the copolymerisation of acrylonitrile with a water-insoluble comonomer in aqueous dispersion by comparison with a known, non-damaging recovery process.

What we claim is:

1. A process for the separation and recovery of unreacted acrylonitrile and comonomers with a boiling point below 99°C under normal conditions from an aqueous polymer dispersion of a filament-forming acrylonitrile polymer, wherein a filterable polymer dispersion, the liquid phase of which may contain up to 7% by weight of residual monomer, is subjected continuously and uniformly to straightforward distillation in a thin-layer evaporator, the pressure prevailing inside the thin-layer evaporator being regulated so that the temperature of the evaporating liquid phase of the polymer dispersion does not exceed 95°C, the average residence time of the polymer dispersion in the evaporator does not exceed 5 minutes, and the evaporation rate of the liquid phase amounts to up to 30% by weight, wherein the vapours given off during evaporation are condensed in a condenser initially under substantially the same pressure which prevails in the thin-layer evaporator and at temperatures above 0°C, after which the vapours which have not been condensed in the condenser are compressed to a pressure higher than that prevailing in the condenser, and wherein the monomer-rich phases obtained, following separation of the aqueous phases, are returned to the polymerisation process.

2. The process of claim 1, wherein a polymerisation inhibitor is added to said polymer dispersion prior to distillation.

3. The process of claim 1, wherein the temperature of the evaporating liquid phase does not exceed 75°C.

4. The process of claim 1, wherein the average residence time of the polymer dispersion does not exceed 20 seconds.

5. The process of claim 1, wherein said evaporation rate amounts to from 10 to 15% by weight.

6. The process of claim 1, wherein said vapours have not been condensed are compressed to atmospheric pressure.

7. The process of claim 1, wherein the monomer-rich phases obtained are rectified prior to their return to the polymerisation process.

8. The process of claim 1, wherein said vapours which have not been condensed are compressed by a liquid jet gas pump wherein the vaporous residual monomers are condensed or absorbed in the propulsive jet.

9. The process of claim 8, wherein the propellant of the liquid jet gas pump comprises substances which are present in the liquefied vapours.

* * * * *